United States Patent [19]

Ford

[11] Patent Number: 4,784,320

[45] Date of Patent: Nov. 15, 1988

[54] METAL HYDRIDE THERMOSTAT

[75] Inventor: Robert N. Ford, San Diego, Calif.

[73] Assignee: General Dynamics Corp./Space Systems Division X, San Diego, Calif.

[21] Appl. No.: 125,845

[22] Filed: Nov. 27, 1987

[51] Int. Cl.⁴ ............................................ G05D 23/00
[52] U.S. Cl. .................................... 236/93 R; 137/118
[58] Field of Search ............... 236/93 R, 93 A, 80 C, 236/86, 87; 60/527, 528, 531; 137/118; 251/11

[56] References Cited

U.S. PATENT DOCUMENTS

| | | | |
|---|---|---|---|
| 1,311,809 | 7/1919 | Giesler | 137/118 |
| 3,817,450 | 6/1974 | Mischke | 236/34.5 |
| 4,282,931 | 8/1981 | Golben | 60/527 X |
| 4,377,209 | 3/1983 | Golben | 169/26 |
| 4,535,590 | 8/1985 | Jacobsen et al. | 60/531 |

*Primary Examiner*—Harry B. Tanner
*Attorney, Agent, or Firm*—John R. Duncan; Frank D. Gilliam

[57] ABSTRACT

A thermostat (10) comprising a metal hydride (26) encased in a bellows (16) and a second bellows (20) encasing available hydrogen gas (32) to be adsorped and desorped by the metal hydride (26). The metal hydride (26) mechanically expands its encasing bellows (16) during adsorption and contracts during desorption of the hydrogen gas while a change in gas pressure due to this adsorption/desorption expands and contracts its encasing bellows (20). Each bellows (16,20) is oppositely acting and each engage a valve seat (36,40), respectively, so that the flow of fluid is directed alternately through one valve seat opening or the other depending upon temperature affecting the gas absorping/desorping properties of the metallic hydride. The temperature at which the thermostat (10) operates may be adjusted by controlling the pressure of the gas in the gas bellows. Also disclosed is a variation of the invention as a thermal switch for space applications.

4 Claims, 2 Drawing Sheets

METAL HYDRIDE THERMOSTAT

BACKGROUND OF THE INVENTION

This invention relates to devices, actuated by temperature, for controlling fluid flow, ie, thermostats, and is particularly directed to a new and improved thermostat utilizing the expansion/contraction properties of metal hydride in response to variations in temperature.

The hydrogen adsorping properties of a hydride are known and one use of such properties in the prior art is disclosed in the U.S. Pat. No. 3,122,728 to Lindberg, Jr. in which the volumetric expansion/contraction of hydrogen gas absorbed and desorped by metal hydride was used to expand and contract a blister which actuated a switch in a control circuit. In this prior art device only the volumetric expansion/contraction of the gas was used but no attempt was made to use the expansion/contraction properties of the hydride itself to mechanically open and close a valve as a means of controlling flow in response to fluid temperatures.

Accordingly, it is an object of this invention to provide a metal hydride thermostat in which both the expansion/contraction properties of hydride and the volumetric expansion/contraction of the adsorped and desorped gas are used to provide a device which operates as a thermostat.

THE SUMMARY OF THE INVENTION

The metal hydride thermostat of this invention comprises a metal hydride encased in a bellows and a second bellows encasing available hydrogen gas to be absorbed and desorped by the hydride. The metal hydride mechanically expands and contracts its encasing bellows during adsorption and desorption of the hydrogen gas while a change in gas pressure due to this adsorption/desorption expands and contracts its encasing bellows. Each bellows is oppositely acting and each engage a valve seat so that the flow of fluid is directed alternately through one valve seat opening or the other depending upon the temperature affecting the gas adsorping properties of the hydride.

The opening and closing of the valves can be adjusted either by controlling the pressure in the gas bellows.

As will be apparent to those skilled in the art, advantages of this invention are:

1. There is a direct inter-relationship between the adsorption and desorption of the hydride which relates to direct motion of the bellows for redirecting the fluid medium.
2. The pressure of the bellows can be preset (or a adjustment by hydrogen pressure control) to level that select the cracking (opening) temperature of the bellows.

The bellows movement is gradual, and
The life of the hydride is indefinite.

DETAILED DESCRIPTION

Figure 1:
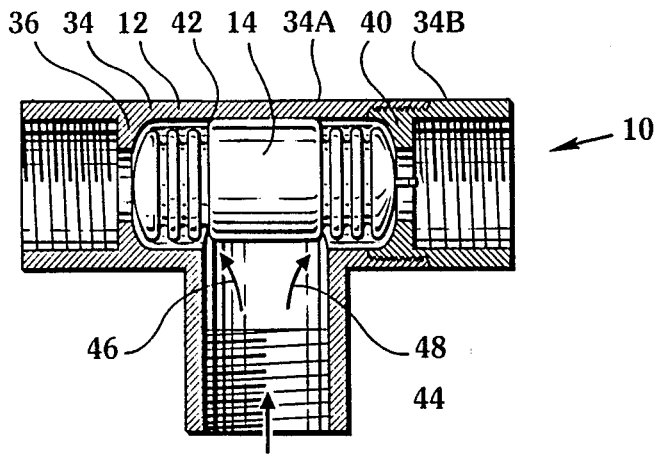
FIG. 1 is a cross sectional elevational view of a schematic illustration of the thermostat of this invention.
Figure 2:
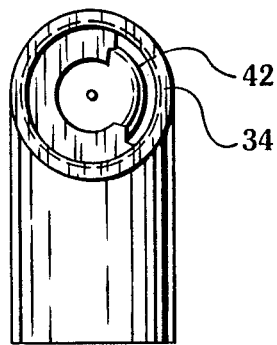
FIG. 2 is an end view of the thermostat of FIG. 1.
Figure 3:
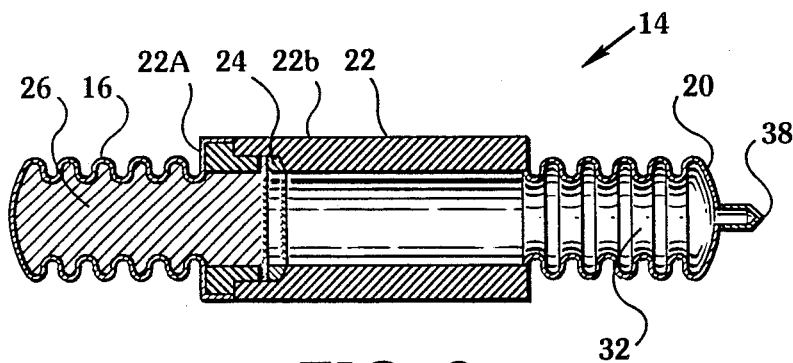
FIG. 3 is a detailed view, enlarged over FIG. 1, illustrating the expandable unit of FIG. 1 in more detail.
Figure 4:
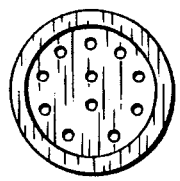
FIG. 4 is a detailed illustration of the screen between the metal hydride and the gas within the expandable unit.

FIGS. 1-4 schematically illustrate thermostat 10 of this invention. FIG. 1 shows a housing, in the form of a T-shaped coupling 12, having an expandable unit 14 inside. The T-shaped coupling 12 is suitably threaded for connection to other units in the conventional manner.

The expandable unit 14 comprises two oppositely acting expandable media, in the form of bellows 16 and 20, which are connected to a centrally located tube 22 and separated by a screen therebetween. Bellows 16 is closed at one end and suitably affixed to the tube 22 (piece 22a) as by welding and contains a metallic hydride compound, such as $LaNi_5 6H$, (also called a metallic hydride bed) which completely fills (packs) the bellows 16 and is denoted as 26. Bellows 20 is also enclosed at one end and also suitably affixed to the tube 22 (piece 22b) as by welding. The bellows 20 has a fitting 30 for filling the bellows with a suitable gas, hydrogen ($GH_2$) and denoted as 32. The screen 24, being porous, contains the metal hydride bed 26 within the bellows 16 yet permits the gas 32 to flow freely therethrough so that the gas is cycled between 364.0 Torr and 2.75 Torr. "Porous" means gas can flow in and out of the hydride bed but solid hydride particles are not permitted to flow through the screen.

The expandable unit 14 is disposed centrally of the horizontal tube 34 of the T-shaped coupling 12. The tube 22 is pressfitted therein so as to be immovable yet allow the bellows 16 and 20 to move freely against and away from their respective valve seats 36 and 40 also located within the horizontal tube 34. The horizontal tube 34, like tube 22, is also in two pieces 34a and 34b threadably coupled together to facilitate insertion of the expandable unit 14 and piece 34a has a locating shoulder 42 to appropriately locate the tube 22 within the tube 34. Too, while the valve seats are shown immovable as an integral part of the tube 34, the valve seats may be threadably inserted into the tube 34 thereby allowing a variance in the distance between the valve seats and their respective bellows (stroke) as a means of regulating the temperature at which the thermostat is responsive.

As shown in FIG. 1, both bellows are spaced from their respective valve seats, but during operation, one of the bellows will engage its valve seat and close the valve seat opening while the other will be spaced from its valve seat to direct the flow of fluid entering the vertical tube 44 through either of the openings in the valve seats as represented by the arrows 46 and 48.

The operation of the thermostat 10 is related to the hydrogen adsorping properties of the hydride. Assuming, for example, that the valve end of the bellows 16 is in engagement with its valve seat 36 and fluid entering the vertical tube 44 is directed out of the opening in the valve seat 40 as represented by arrow 48, when the fluid entering the tube 44 reaches a temperature at which the hydrogen is desorped (given off) by the hydride, the hydride 26 has a volumetric reduction of 20-25%. This reduction in volume causes motion of the bellows 16 which unseats the bellows from the valve seat 36 thereby opening the valve 36 causing a redirection of fluid flow as represented by the arrow 46. During desorption of the hydrogen from the hydride, the available hydrogen now pressurizes the bellows 20 causing it to expand and engage the valve seat 40 thereby closing the fluid flow through that valve opening.

When the temperature of the fluid flowing through the tube 44 cools to a point where the hydride adsorps (takes in), the hydride expands and the bellows 16 reacts by engaging the valve seat 36. The bellows 16 then disengages its valve seat 40 opening the valve seat to the flow of fluid therethrough.

The opening and closing of the thermostat can be preset to a selected temperature such as room temperature and the over pressure in the gas bellows can be set for whatever actuation temperature is desired.

Figure 5:
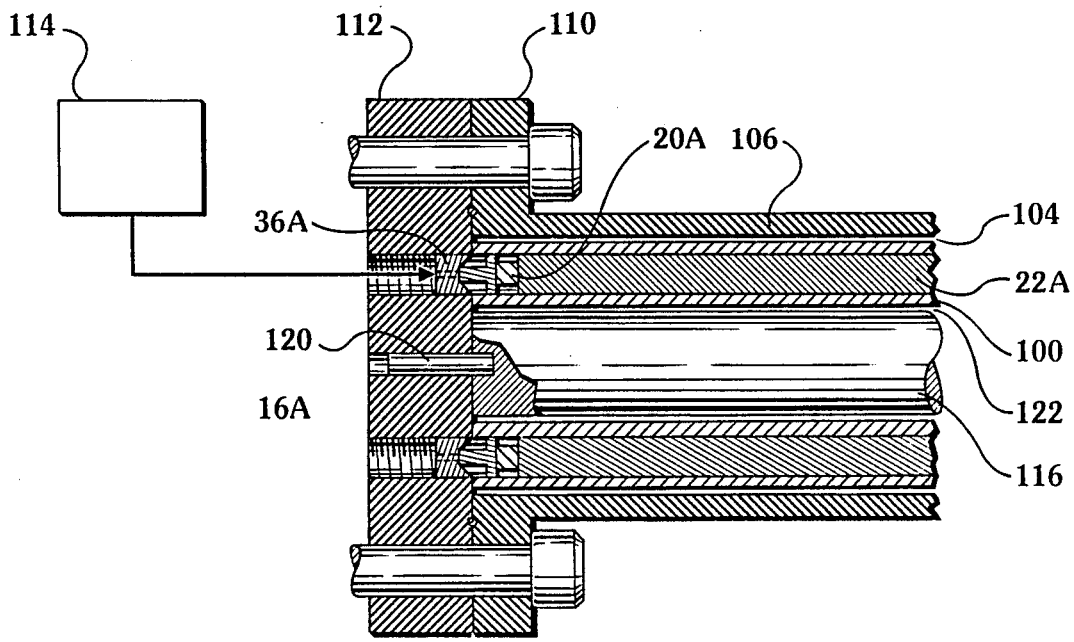
FIG. 5 is a cross sectional view of a variation of the invention using an annular metal hydride bed operating as a thermal switch with FIG. 5 showing gas adsorption.
Figure 6:
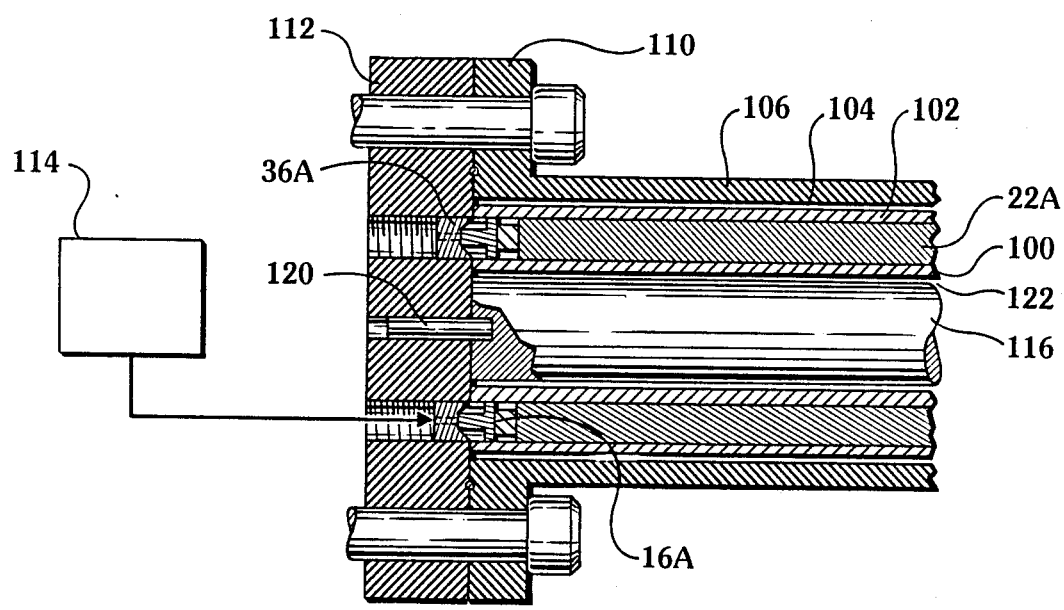
FIG. 6 is similar to FIG. 5 but showing the position of the bellows during gas desorption.

Turning now to FIGS. 5, 6, 7 and 8, there is shown another embodiment of the metal hydride thermostat as a thermal switch. In this embodiment, those components have the same or similar function will be given the same reference numeral but with a suffice A to simplify and shorten the description thereof. Thus, the metal hydride bed 26A is shown as a cylinder encased within cylindrical walls 100 and 102 and narrowly spaced as at 104 from an outer metal cylinder 106 which acts as a heat dissipating fin. Flange 110 on the fin are used to connect the switch to one wall 112 of a metal hydride compressor 114. Bellows 16A and bellows 20A correspond to bellows 16 and 20 in FIG. 3, respectively. Within the inner wall 100 is a heat pipe 116 precisely located relative to the wall 100 by a locating pin 120. The outer periphery of the heat pipe 116 is also narrowly spaced as at 122 from the wall 100. Thus, the switch is responsive to variations in temperature of the heat pipe. In FIG. 5, the metallic bellows 20A is shown in an adsorption condition so that gas from the metal hydride compressor 114 passes through valve seat 36A and pressurizes the space 104 between the outer wall 102 and the fin allowing heat reaction to flow out. In FIG. 6, bellows 16A is shown in a desorption condition directing the flow of gas from the metal hydride compressor to space 122 between the heat pipe and the wall 100 thereby allowing heat to flow to the metal hydride bed.

Figure 7:
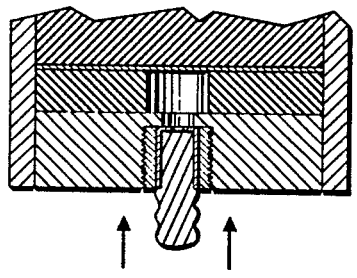
FIGS. 7 and 8 are graphic illustrations of the thermal switch of FIGS. 5 and 6, and FIGS. 9 and 10 are enlarged detailed illustrations showing the relationship of the metal hydride bellows and the valve seat in the switch of FIGS. 5 and 8.
Figure 8:
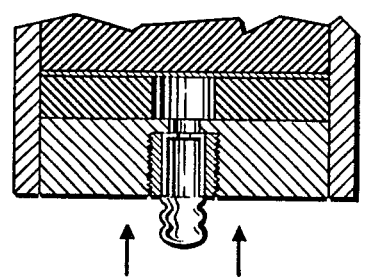

FIGS. 7 and 8 illustrate the two positions of the two separate bellows of FIGS. 5 and 6 but in graphic form.

Figure 9:
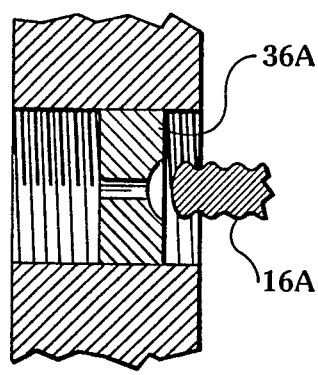
Figure 10:
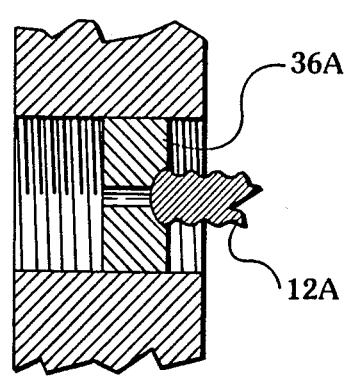

FIGS. 9 and 10, being enlargements of the area of the valve seat 36A and the metal hydride bellows 16A illustrate the opening and closing of the valve as well as illustrating the means of controlling the stroke of the bellows by threading and unthreading the valve seat within the wall 112.

What is claimed is:

1. A metal hydride thermostat comprising,
    a first expandable medium containing metal hydride,
    a second expandable medium containing a gas, said medium opening into said metal hydride so as to be adsorped and desorped thereby in response to temperature,
    a first valve seat with an opening spaced from said first expandable medium,
    a second valve seat with an opening spaced from said second expandable medium,
    said first and second expandable mediums alternately engaging said first and second valve seats in response to variations in temperature thereby alternately opening and closing associated therewith,
    means for directing fluid to said expandable media at varying temperatures to expand or contract either of said media to cause said alternate opening and closing of said openings to thereby alternately direct said fluid through either of said openings depending on the temperature of said fluid.

2. The thermostat as claimed in claim 1 wherein said media are metallic bellows and wherein said gas and metal hydride are separated by a porous sleeve.

3. The thermostat as claimed in claim 2 wherein the adsorption and desorption properties of said metal hydride are controlled by the space between said media and said valve seats.

4. The thermostat as claimed in claim 2 wherein the adsorption and desorption properties of said metal hydride are controlled by the pressure of said gas in said second bellows.

* * * * *